(12) United States Patent
Schoenlinner et al.

(10) Patent No.: US 9,548,531 B2
(45) Date of Patent: Jan. 17, 2017

(54) METHOD FOR MANUFACTURING A RADOME

(71) Applicant: Airbus Defence and Space GmbH, Ottobrunn (DE)

(72) Inventors: Bernhard Schoenlinner, Munich (DE); Ulrich Prechtel, Munich (DE); Thomas Schuster, Nersingen (DE); Michael Sabielny, Ulm (DE); Herbert Zippold, Bruckmuehl (DE); Kay W. Dittrich, Ingolstadt (DE); Franz Stadler, Boehmfeld (DE); Markus Rothenhaeusler, Pfaffenhofen (DE); Wilhelm Wulbrand, Markdorf (DE); Thomas Koerwien, Hoehenkirchen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 15 days.

(21) Appl. No.: 14/748,892

(22) Filed: Jun. 24, 2015

(65) Prior Publication Data

US 2015/0380811 A1    Dec. 31, 2015

(30) Foreign Application Priority Data

Jun. 25, 2014   (DE) .................. 10 2014 108 896

(51) Int. Cl.
*H01Q 1/42*       (2006.01)
*H01Q 15/14*      (2006.01)
(Continued)

(52) U.S. Cl.
CPC .............. *H01Q 1/42* (2013.01); *H01Q 15/141* (2013.01); *H01Q 1/28* (2013.01); *H01Q 1/3275* (2013.01);
(Continued)

(58) Field of Classification Search
CPC .............. H01Q 1/42; H01Q 1/40; H01Q 1/38; H01Q 1/422; H01Q 1/28; H01Q 3/08; H01Q 1/3275
(Continued)

(56) References Cited

U.S. PATENT DOCUMENTS 5,683,646 A     11/1997  Reiling, Jr.
7,242,365 B1 *  7/2007   Boatman .................. H01Q 1/42
                                                      343/872

FOREIGN PATENT DOCUMENTS

DE    3920110 A1    2/1991
DE    696 14 690 T2  6/2002
EP    2 383 364 A1   11/2011

OTHER PUBLICATIONS

European Search Report issued in counterpart application No. EP 15001850 dated Nov. 6, 2015, with Statement of Relevancy (Two (2) pages).

* cited by examiner

*Primary Examiner* — Joseph Lauture
(74) *Attorney, Agent, or Firm* — Crowell & Moring LLP

(57) ABSTRACT

A method is provided for manufacturing a radome. The method has the following steps: creation of a contoured fit of at least one section of an inner surface of a wall of the radome; arrangement of a plurality of planar photosensitive semiconductor elements on an outer surface of the contoured fit; placement of the contoured fit with the plurality of planar photosensitive semiconductor elements on the at least one section of the inner surface of the wall; establishing of a connection between the plurality of planar photosensitive semiconductor elements and the wall; and removal of the contoured fit from the radome. This method enables the (Continued)

simple manufacture of a radome with a layer having several semiconductor elements for the electromagnetic shielding of the interior of the radome.

18 Claims, 3 Drawing Sheets

(51) Int. Cl.
  *H01Q 1/40* (2006.01)
  *H01Q 1/28* (2006.01)
  *H01Q 1/32* (2006.01)
  *H01Q 1/38* (2006.01)
  *H01Q 3/08* (2006.01)
(52) U.S. Cl.
  CPC *H01Q 1/38* (2013.01); *H01Q 1/40* (2013.01); *H01Q 1/422* (2013.01); *H01Q 3/08* (2013.01); *Y02T 50/433* (2013.01)
(58) Field of Classification Search
  USPC ........ 343/872, 873, 897, 907, 705, 711, 757
  See application file for complete search history.

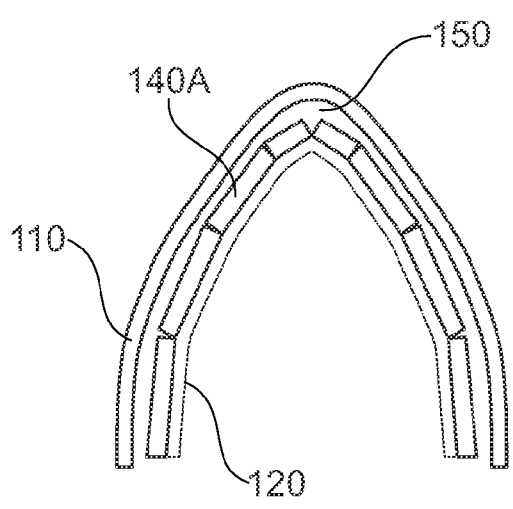
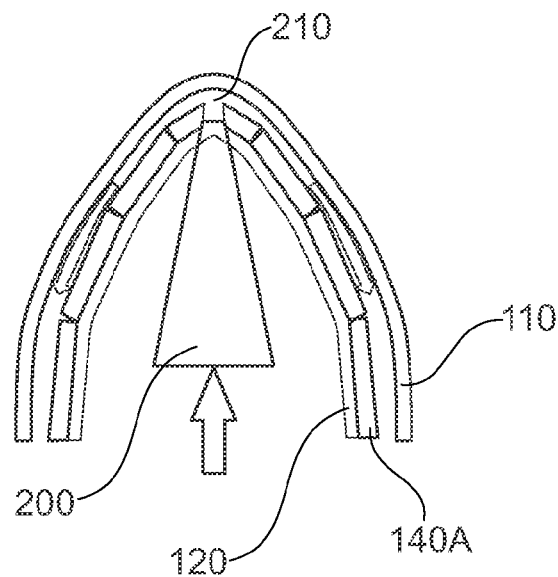
Fig. 4    Fig. 5
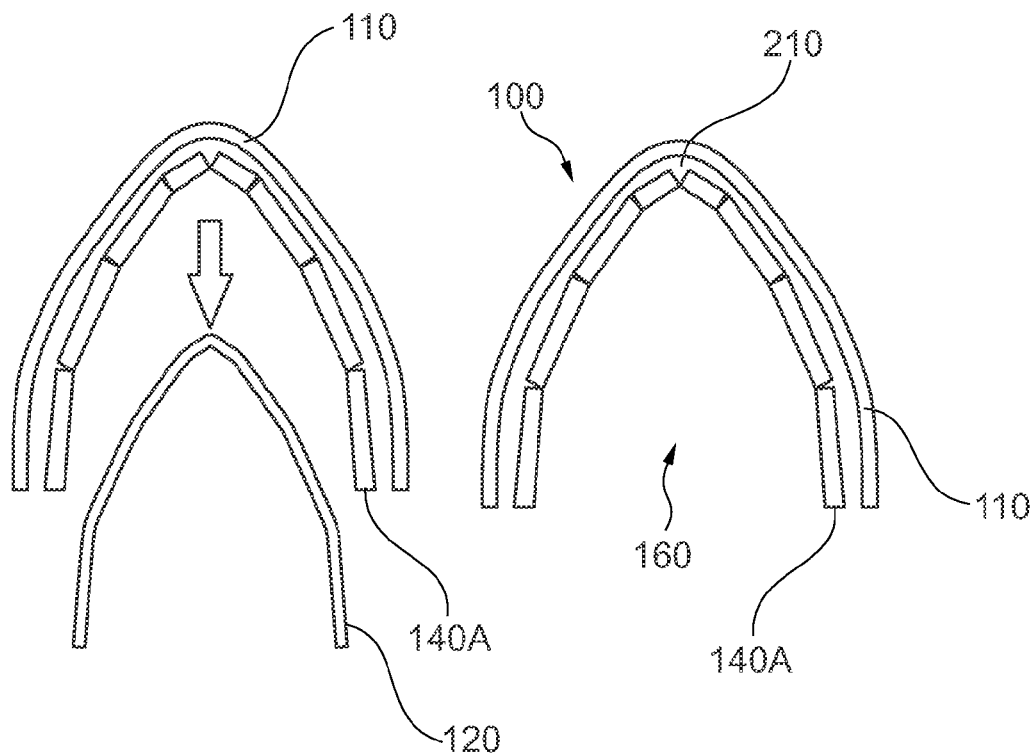
Fig. 6    Fig. 7

METHOD FOR MANUFACTURING A RADOME

CROSS REFERENCE TO RELATED APPLICATION

This application claims priority under 35 U.S.C. §119 from German Patent Application No. 10 2014 108 896.4, filed Jun. 25, 2014, the entire disclosure of which is herein expressly incorporated by reference.

TECHNICAL FIELD

The invention relates to a method for manufacturing a radome and to a radome, particularly a radome manufactured using the method.

BACKGROUND OF THE INVENTION

A radome can be referred to as an electromagnetic window or radiation dome and is usually used in automobiles or in stationary operation and in order to protect antennas, for example, from external influences, particularly environmental influences. One requirement placed on a radome is that it be electromagnetically permeable (transparent) in order to allow electromagnetic waves to pass through that are transmitted by an antenna or are to be received by the antenna.

In the case of flying platforms camouflaged against radar detection, particularly the section of the platform that is located behind a radome can be a source of reflection of the radar.

The radar-camouflaging of flying platforms is achieved, among other things, through the shape of an electrically conductive outer skin of the platforms, thus influencing the reradiation of electromagnetic waves from this outer skin to a radar. Such platforms can be referred to as platforms with reduced radar signature. A neuralgic point of high reradiation can lie particularly in the antennas of the radar and communication systems of flying platforms, provided that a radome of the antenna apertures is designed with aerodynamic and not camouflage-related aspects in mind. Since a radome is usually designed so as to be electromagnetically permeable in order to permit the transmission of signals from and to the radar and communication systems, a radome is also permeable to radar signals of a detecting radar. Strongly back-scattering antenna apertures can thus weaken or inadmissibly impair the camouflaging of the flying platform.

Known radomes can have a frequency-selective layer which allows signals of its own radar and communication systems to pass through and reflects signals of other frequencies in a desired direction or does not allow them to pass through. The drawback of this solution is that a camouflage effect is not provided for the working frequency of one's own radar and communication systems.

One broadband approach to a solution is a radome that is permeable to all frequencies in a first state and impermeable or reflective to all frequencies in a second state.

One example of such a radome that is optionally permeable or reflective to electromagnetic waves is a radome with a photosensitive layer, as described in DE 39 20 110 A1. The photosensitive layer consists of a semiconductor photoresistor. In this material, incident photons bring about a release of charge carriers in the material of the semiconductor. The conductivity of the semiconductor is thus dependent on an incident illumination level and can be reversibly changed, whereby the permeability of the semiconductor and hence of the radome to electromagnetic waves can be controlled. In a low charge carrier state (unilluminated), the layer is electromagnetically permeable, whereas it is electromagnetically impermeable in a state with loose or released charge carriers (illuminated). The conductivity of the semiconductor elements can change by several orders of magnitude between the unilluminated and the illuminated state, for example by up to 4 to 5 powers of ten.

Due to the platform-specific shape of a radome, the physical characteristics of usable radome materials and the requirements placed on the photosensitive coating, it is a technical challenge to provide a radome with a suitable photosensitive semiconductor coating.

SUMMARY OF THE INVENTION

It can be regarded as being an object of the present invention to provide a method which enables the simplified manufacture of a radome that is optionally electromagnetically permeable or reflective over a broad-band.

According to one aspect, a method for manufacturing a radome is described. The method has the following steps: creation of a contoured fit of at least a section of an inner surface of a wall of the radome in a first step; arrangement of a plurality of planar photosensitive semiconductor elements on an outer surface of the contoured fit in a second step; placement of the contoured fit with the plurality of planar photosensitive semiconductor elements on the at least one section of the inner surface of the wall in a third step; establishing of a connection between the plurality of planar photosensitive semiconductor elements and the wall in a fourth step; and removal of the contoured fit from the radome in a fifth step.

This method enables simple manufacture of a radome with a layer having several semiconductor elements for the electromagnetic shielding of the interior of the radome.

The contoured fit can particularly be made of a solidifying material by creating a negative impression of the inner surface of the wall of the radome. In the solidified state of the contoured fit, it is rigid or substantially rigid. The negative impression can be produced of the entire inner surface of the wall. Alternatively, the contoured fit can be formed from plastic.

As an alternative to the preparation of a negative of a radome, the contoured fit can also be produced as a reproduction based on construction plans of the radome.

The planar photosensitive semiconductor elements can particularly be flat elements; that is, these elements have no curvature, particularly no spatial curvature and are embodied, for example, as polyhedrons or bodies having at least two opposing surfaces. In an alternative embodiment, the semiconductor elements can also be embodied as uneven elements.

The semiconductor elements can particularly be made of silicon, for example of undoped or low-doped high-impedance silicon. Preferably, the semiconductor elements are monocrystalline semiconductors. The semiconductor elements can be silicon tiles having a material thickness between 200 µm and 300 µm.

At least one base surface of the planar photosensitive semiconductor elements can be embodied as a regular or irregular polygon. Each polygon can have edges with equal or different edge lengths. Likewise, the aperture angle of the corners can be different from, or equal to, each other. Each edge length of a polygon can vary from a few millimeters (mm), for example between 1 to 3 mm, to a few or several centimeters (cm), for example 5 to 10 cm.

At least one section of the surface of the semiconductor elements can have a thermal silicon oxide. By virtue of the silicon oxide, this section of the surface can be rendered antireflective. Through irradiation of such a semiconductor element with optical energy, for example in the form of light in the visible range or in the infrared range, a high level of electrical conductivity is imparted to the semiconductor element.

The planar semiconductor elements can particularly be made of prefabricated semiconductor discs or semiconductor shells (such as silicon wafers, for example). This can be done, for example, by using suitable separation methods in order to separate off a portion of such a semiconductor disc such that a planar photosensitive semiconductor element is produced therefrom. Due to their size, the semiconductor discs can be mounted on curved surfaces only under certain conditions insofar as the maximum distance between the semiconductor disc and the curved surface must not exceed a prescribable value. For this reason, these semiconductor discs are cut into smaller pieces so that, through the arrangement of a plurality of such smaller pieces in rows, a curved inner surface of a radome wall can be covered approximately with such pieces.

In principle, the method as described above and below is suitable for any geometric dimensions.

The contoured fit is placed with the planar photosensitive semiconductor elements arranged on its outer surface against the wall of the radome such that the semiconductor elements are located between the contoured fit and the wall. In this state, the corners or edges of the semiconductor elements can rest against the inner surface of the wall, but they can also be spaced apart therefrom.

The plurality of planar photosensitive semiconductor elements is connected to the wall, particularly the inner surface of the wall, particularly by use of a mechanical connection, for example an adhesive or bonded connection.

The contoured fit is then removed from the interior of the wall. This step is particularly carried out only when the adhesive or bonded connection between the semiconductor elements and the inner surface of the wall has hardened or become sufficiently capable of bearing a load in order to fix the semiconductor elements in their position.

According to one embodiment, the inner geometry of the wall of the radome is detected and subdivided into planar subregions before the arrangement of the plurality of planar photosensitive semiconductor elements on the outer surface of the contoured fit, and the plurality of planar photosensitive semiconductor elements is readied according to the shape of the flat subregions.

The inner geometry of the wall of the radome is particularly to be understood as a spatial curvature of the at least one section of the inner surface of the wall of the radome. A flat subregion has no spatial curvature.

In other words, the shape of a spatially curved wall of the radome is approximately reproduced by flat subregions. By outfitting the contoured fit with the semiconductor elements and guiding it against the inner surface of the wall, the plurality of semiconductor elements can effectively be brought close to the inner surface of the wall, particularly when accessing the inner surface of the wall in order to individually arrange the semiconductor elements is difficult or excessively time-consuming for a person or a production robot.

The placement of semiconductor elements on the contoured fit also enables an arrangement of the semiconductor elements next to each other that is as precise as possible, so that the distances between adjacent semiconductor elements can be predetermined.

According to another embodiment, before the arrangement of the plurality of planar photosensitive semiconductor elements on the outer surface of the contoured fit, the outer surface of the contoured fit is provided with a layer that is adhesive on at least one side in order to fix the plurality of planar photosensitive semiconductor elements on an adhesive surface of the layer.

The layer that is adhesive on one side can be an adhesive film, for example, having an adhesive material on at least one outer side. The outer side of the layer is the surface that is facing away from the outer surface of the contoured fit facing toward the inner surface of the wall. As a result, the planar photosensitive semiconductor elements adhere to the outer surface of the layer and can thus be placed in the position on the inner surface of the way defined in this way.

Alternatively, the layer that is adhesive on one side can also be a coating of the contoured fit. This coating can be an adhesive or bonding mass that can be released in later method steps, so that the connection between the semiconductor elements and the contoured fit is released.

According to another embodiment, the layer is reversibly coupled with the contoured fit. This means that either the adhesive film can be released from the contoured fit or that an adhesive coating of the contoured fit can be dissolved in order to remove the contoured fit after the semiconductor elements have been put in position, i.e., fastened to the inner surface of the wall.

According to another embodiment, the layer is fixed by a low pressure relative to the contoured fit.

The low pressure is a reduced gas pressure in relation to the atmospheric pressure surrounding the contoured fit. The adhesive layer, for example in the form of an adhesive film, can be pressed through the atmosphere against the outer surface of the contoured fit. The layer is thus fixed particularly relative to the outer surface of the contoured fit.

According to another embodiment, the connection between the layer and the contoured fit is released before the removal of the contoured fit from the radome.

As a result, the position of the semiconductor elements in relation to the inner surface of the wall is no longer changed when the contoured fit is taken out.

According to another embodiment, the release of the connection between the layer and the contoured fit includes the reduction of the low pressure.

The adhesive film is therefore no longer pressed against the outer surface of the contoured fit, and the contoured fit can be removed from the adhesive film. In the event that an adhesive film is used as a layer for attaching the semiconductor elements to the contoured fit, at least parts of the adhesive film can remain on the wall after the removal of the contoured fit.

According to another embodiment, the release of the connection between the layer and the contoured fit includes the application of a solvent.

A solvent can particularly reduce or eliminate bonding or adhesive force, so that the contoured fit can be removed without exerting force on the wall or the semiconductor elements.

According to another embodiment, the release of the connection between the layer and the contoured fit includes the increasing of a temperature of the layer.

An increased temperature can simplify the separability of an adhesive connection. Particularly, this increased temperature can be used if a layer has an adhesive that is releasable at elevated temperature.

According to another embodiment, the creation of the connection between the plurality of planar photosensitive semiconductor elements and the radome includes the step: placement of an adhesive mass into an interspace between the outer surface of the contoured fit and the inner surface of the wall.

This adhesive mass fixes the semiconductor elements in relation to the wall, particularly in relation to the inner surface of the wall. The adhesive mass can be a silicone adhesive, for example.

According to another aspect, a radome is described which has a wall and a plurality of planar photosensitive semiconductor elements. The planar photosensitive semiconductor elements are arranged on an inner surface of the wall. Each of the semiconductor elements is flat and coupled by way of an adhesive mass with the inner surface.

The radome according to this aspect is a radome that was manufactured using the method described above. In this respect, the description of the method also applies analogously to such a radome. Structural features have already been described with respect to the method and applied accordingly to the radome.

According to one embodiment, the planar photosensitive semiconductor elements cover the entire inner surface of the wall.

Since the semiconductor elements are flat elements that are separated from each other, small prescribable distances are maintained between adjacent semiconductor elements when they are arranged on the inner surface of the wall. In this embodiment, the inner surface is thus substantially covered in its entirety by adjacent individual semiconductor elements.

An alternative to the complete covering of the inner surface of the wall with photosensitive semiconductor elements is the covering of the wall with a frequency-selective layer and the placement of photosensitive elements on the frequency-selective layer, only a partial covering of the inner surface of the wall with photosensitive semiconductor elements being required, so that the electromagnetic characteristics of the frequency-selective layer can be changed by the photosensitive semiconductor elements.

For this purpose, a photosensitive substance can be arranged on apertures of a metallic film (frequency-selective layer) or metallic paths, the metallic film or metallic paths or conductive paths being located on the inner surface of the wall.

According to another embodiment, the semiconductor elements are non-doped silicon.

Other objects, advantages and novel features of the present invention will become apparent from the following detailed description of one or more preferred embodiments when considered in conjunction with the accompanying drawings.

BRIEF DESCRIPTION OF THE FIGURES

FIG. 4 shows a schematic representation of a step of the method according to an exemplary embodiment.

FIG. 5 shows a schematic representation of a step of the method according to an exemplary embodiment.

FIG. 6 shows a schematic representation of a step of the method according to an exemplary embodiment.

FIG. 7 shows a schematic representation of a radome according to an exemplary embodiment.

DETAILED DESCRIPTION OF EXEMPLARY EMBODIMENTS

The illustrations in the figures are schematic and not true to scale. When the same reference symbols are used in the following description of the figures, they refer to the same or similar elements. The radome and the contoured fit are three-dimensional objects which are represented in cross section for the sake of simplicity.

A radome 100 as shown in FIGS. 1 to 7 has a substantially or roughly U- or V-shaped cross section and the wall 110 runs such that it encloses an interior space 160, in which the antennas to be protected are arranged when the radome is fastened to a platform.

The interior space 160 is open or accessible at least on one side in order to enable connection of the radome to the platform and receiving of the antennas to be protected.

Figure 1:
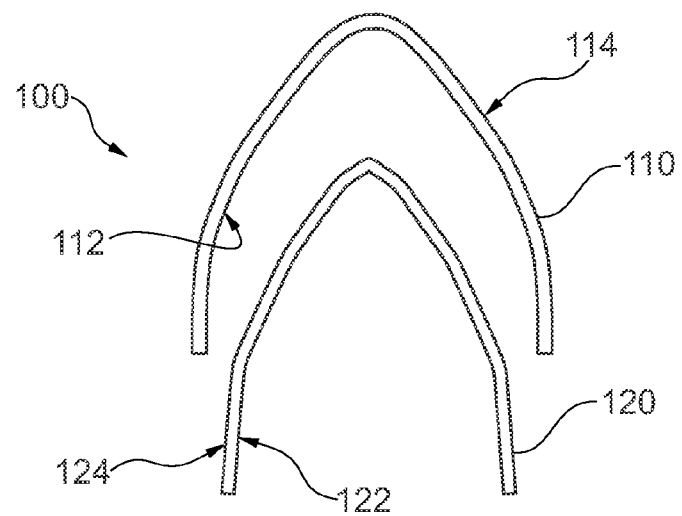
FIG. 1 shows a schematic representation of a step of the method according to an exemplary embodiment.

FIG. 1 shows a schematic illustration of a step of the manufacture of a contoured fit 120 with an inner surface 122 and an outer surface 124. The outer surface 124 of the contoured fit 120 corresponds substantially to the inner surface 112 of the wall 110 of the radome. The wall 110 has an outer surface 114.

The contoured fit 120 is embodied such that it is slightly smaller than the interior space of the wall 110, thus enabling the semiconductor elements to be inserted together with the platform into the interior space.

Figures 2, 3:
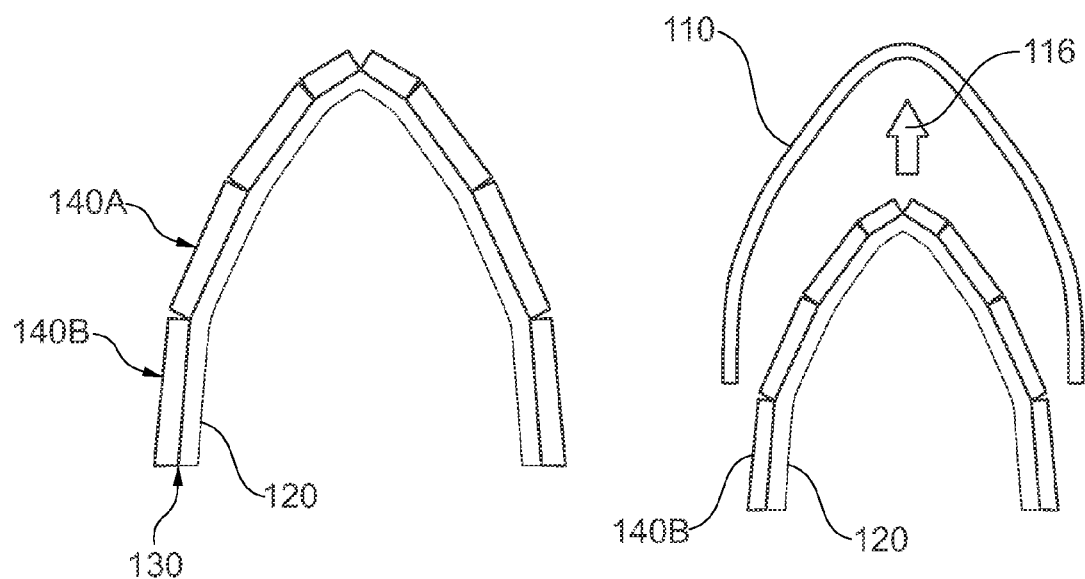
FIG. 2 shows a schematic representation of a step of the method according to an exemplary embodiment.
FIG. 3 shows a schematic representation of a step of the method according to an exemplary embodiment.

FIG. 2 shows the contoured fit 120 on whose outer surface 124 is arranged a plurality of planar semiconductor elements 140A, 140B. An adhesive layer 130 is arranged on the outer surface 124 of the contoured fit 120 that fixes the semiconductor elements 140A, 140B in relation to the contoured fit.

FIG. 3 shows how the contoured fit 120 outfitted with semiconductor elements 140B is inserted into the interior space of the wall 110. A movement occurs here in the direction of the arrow 116 until the contoured fit 120 rests against the inner surface 122 of the wall 110, as shown in FIG. 4.

In the state shown in FIG. 4, the semiconductor elements 140A are at a minimum distance to the wall or rest against it at least in sections, at their corners in this embodiment. Since the semiconductor elements are flat, planar elements, an interspace 150 is formed at least in sections through the curvature of the wall 110.

An adhesive mass 210 is introduced by way of an adhesive device 200 into this interspace 150 in order to fix the semiconductor elements 140A in relation to the wall 110.

The adhesive mass can be introduced or injected through an opening in the contoured fit 120 and between two adjacent semiconductor elements into the interspace, as shown in FIG. 5. The adhesive mass introduced in this way propagates in the interspace and fixes the semiconductor elements in relation to the wall.

After this step or after hardening of the adhesive mass 210, the adhesive force of the adhesive layer 130 is released in order to enable removal of the contoured fit 120 without exerting a force on the semiconductor elements or the wall that exceeds a prescribable threshold value; see FIG. 6.

As a result, the radome 100, on whose wall 110 individual, planar, flat semiconductor elements 140A are arranged, remains in order to enable electromagnetic permeability or impermeability to be brought about.

Figure 8:
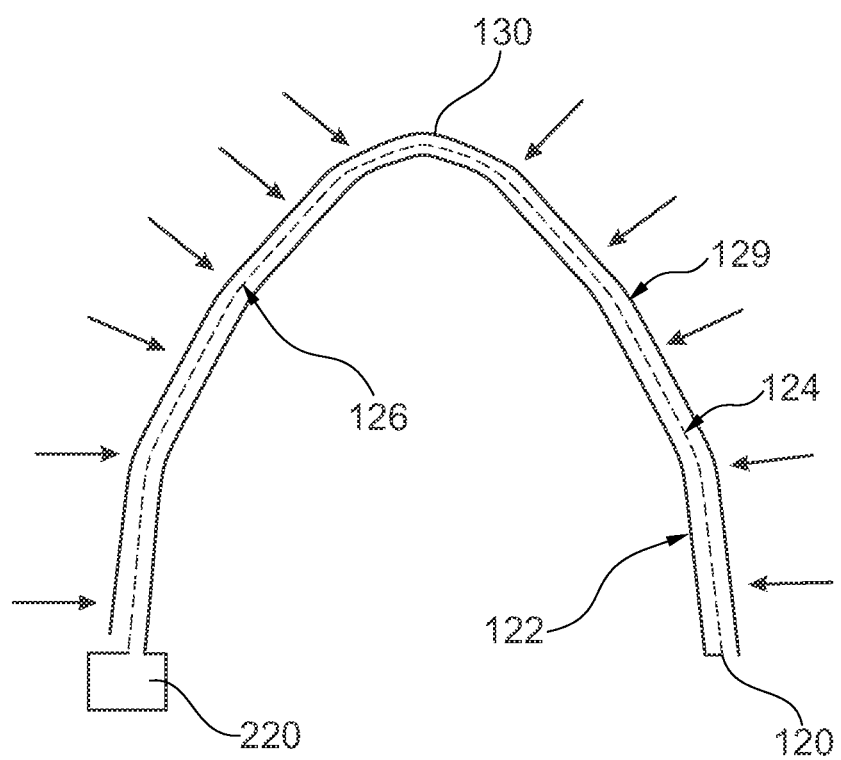
FIG. 8 shows a schematic representation of a contoured fit for manufacturing a radome according to an exemplary embodiment.

FIG. 8 shows a contoured fit 120 for fixing an adhesive layer 130 by way of low pressure in relation to the outer surface 124 of the contoured fit 120.

The outer surface 124 of the contoured fit 120 has a plurality of openings 126. Located between the outer surface 124 and the inner surface 122 is an interspace which can be loaded with a low pressure, for example by coupling a vacuum or low pressure generator 220 with this interspace and extracting a gas, e.g., air. If the adhesive layer 130 is placed onto the outer surface 124 it is pressed and fixed on the outer surface 124 of the contoured fit by the pressure difference between the interspace and the surroundings in the direction of the arrows 129, so that the adhesive layer 130 can neither detach from the outer surface 124 nor move in relation to the outer surface 124.

The outer surface of the adhesive layer 130 is adhesive, whereas the inner surface of the adhesive layer 130 is not adhesive. As a result, the semiconductor elements can be adhered on the adhesive layer 130, whereas the contoured fit is reversibly coupled with the layer 130, and this coupling can be released at any time through reduction of the low pressure in order to remove the contoured fit from the radome.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a radome, the method comprising the acts of:
    creating a contoured fit of at least one section of an inner surface of a wall of the radome;
    arranging a plurality of planar photosensitive semiconductor elements on an outer surface of the contoured fit;
    placing the contoured fit with the plurality of planar photosensitive semiconductor elements on the at least one section of the inner surface of the wall;
    establishing a connection between the plurality of planar photosensitive semiconductor elements and the wall; and
    removing the contoured fit from the radome.

2. The method according to claim 1, further comprising the acts of:
    before the act of arranging the plurality of planar photosensitive semiconductor elements on the outer surface of the contoured fit, detecting an inner geometry of the wall of the radome and subdividing the detected inner geometry into flat subregions; and
    making available the plurality of planar photosensitive semiconductor elements according to one or more shapes of the flat subregions.

3. The method according to claim 2, further comprising the act of:
    before the arranging of the plurality of planar photosensitive semiconductor elements on the outer surface of the contoured fit, providing the outer surface of the countoured fit with a layer that is adhesive on at least one side in order to fix the plurality of planar photosensitive semiconductor elements on an adhesive surface of the layer.

4. The method according to claim 3, wherein the layer is reversibly coupled with the contoured fit.

5. The method according to claim 4, wherein the layer is fixed by a low pressure relative to the contoured fit.

6. The method according to claim 5, further comprising the act of:
    for the removing of the contour fit from the radome, releasing the connection between the layer and the contoured fit.

7. The method according to claim 6, wherein the act of releasing the connection between the layer and the contoured fit is carried out by decreasing the low pressure.

8. The method according to claim 6, wherein the act of releasing the connection between the layer and the contoured fit is carried out by applying a solvent.

9. The method according to claim 6, wherein the act of releasing the connection between the layer and the contoured fit is carried out by increasing a temperature of the layer.

10. The method according to claim 3, wherein the layer is fixed by a low pressure relative to the contoured fit.

11. The method according to claim 3, further comprising the act of:
    for the removing of the contour fit from the radome, releasing the connection between the layer and the contoured fit.

12. The method according to claim 3, wherein the act of establishing the connection between the plurality of planar photosensitive semiconductor elements and the wall of the radome comprises the act of:
    introducing an adhesive mass into an interspace between the outer surface of the contoured fit and the inner surface of the wall.

13. The method according to claim 1, further comprising the act of:
    before the arranging of the plurality of planar photosensitive semiconductor elements on the outer surface of the contoured fit, providing the outer surface of the countoured fit with a layer that is adhesive on at least one side in order to fix the plurality of planar photosensitive semiconductor elements on an adhesive surface of the layer.

14. The method according to claim 1, wherein the act of establishing the connection between the plurality of planar photosensitive semiconductor elements and the wall of the radome comprises the act of:
    introducing an adhesive mass into an interspace between the outer surface of the contoured fit and the inner surface of the wall.

15. A radome, comprising:
    a wall having an inner and outer surface;
    a plurality of planar photosensitive semiconductor elements arranged on the inner surface of the wall, wherein
    each of the plurality of planar photosensitive semiconductor elements is flat and is coupled via an adhesive mass with the inner surface of the wall.

16. The radome according to claim 15, wherein the plurality of planar photosensitive semiconductor elements are arranged to cover an entire inner surface of the wall.

17. The radome according to claim 16, wherein the plurality of planar photosensitive semiconductor elements are non-doped silicon elements.

18. The radome according to claim 15, wherein the plurality of planar photosensitive semiconductor elements are non-doped silicon elements.

\* \* \* \* \*